United States Patent Office 3,659,015
Patented Apr. 25, 1972

3,659,015
DERIVATIVES OF 2-CAMPHANAMINES AS ANTI-INFLUENZA AGENTS
Conrad E. Hoffmann, Newark, Del., assignor to E. I. du Pont de Nemours and Company, Wilmington, Del.
No Drawing. Continuation-in-part of application Ser. No. 422,513, Dec. 31, 1964. This application Apr. 21, 1967, Ser. No. 632,537
Int. Cl. A61k 27/00
U.S. Cl. 424—325
11 Claims

ABSTRACT OF THE DISCLOSURE

Method of using 2-camphanamine and its N-alkyl, N,N-dialkyl, derivatives and pharmaceutically acceptable salts of said compounds for pharmaceutical effectiveness against influenza virus infection of warm-blooded animals

CROSS REFERENCE TO RELATED APPLICATIONS

This application is a continuation-in-part of my copending application Ser. No. 422,513, filed Dec. 31, 1964 now abandoned.

BACKGROUND OF THE INVENTION

My invention relates to the pharmaceutical use of 2-camphanamine derivatives as anti-influenza agents in warm-blooded animals.

Compounds within the scope of this invention include 2-camphanamine, its monoalkyl derivatives through butyl and its dimethyl and diethyl derivatives. Reference to these compounds will be found in; Leukavt and Bach, Ber. 20, 104 (1887), Valloch and Griepeukerl, Ann. 269, 347 (1892) and Konowalow, J. Rus. Phys. Cheu. Soc. 33, 46 (1901). Although these references discuss camphanamines they do not indicate that they compounds have pharmaceutical activity.

SUMMARY OF THE INVENTION

This invention relates to the use of the chemical derivatives of 2-camphanamine as anti-influenza agents. It relates to processes and compositions connected with the use of these derivatives as influenza virucide.

The 2-camphanamines within the scope of the present invention are represented by the following formula:

(1)

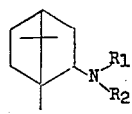

where $R_1$ and $R_2$ can be the same or different and are selected from the group consisting of hydrogen; alkyl of 1 through 4 carbons.

It will be understood that the compounds of Formula 1 form salts with non-toxic acids and that such salts are included within the scope of this invention. Examples of such salts are the hydrochloride, hydrobromide, sulfate, phosphate, acetate, lactate, succinate, propionate, pamoate, tartrate, acetyl salicylate, citrate, caprochlorone and penicillin. Of these the hydrochloride and acetate are preferred.

Mixtures of compounds are, of course, contemplated to fall within the scope of this invention, whether obtained as such in synthesis or specifically admixed after preparation.

Included within the scope of this invention are compounds which are hydrolyzed in the animal to the chemical derivatives of 2-camphanamines represented by Formula 1.

It is to be understood that the term 2-camphanamine includes both of the diastereoisomeric 2-amino derivatives of camphane. The exo 2-amino derivative is named 2-neobornylamine or 2-isobornylamine and the endo derivative is called 2-bornylamine (G. Vavon and I. Chilouet, Compt. rend., 204, 50 (1937)). Both diastereoisomers have two optically active forms, D and L, and the term 2-camphanamine therefore includes four optically-active isomers, D-2-neobornylamine, L-2-neobornylamine, D-2-bornylamine and L-2-bornylamine.

From the above descriptions it can be seen that this invention broadly embodies the 2-camphanamines as anti-influenza agents.

2-camphanamine is significantly distinctive, having remarkable anti-influenza effectiveness, as illustrated in the form of its hydrochloride salt by activity against Influenza A (WSN and swine), Influenza A-2 (strains Michigan A/AA), Influenza B (Lee), Influenza D (Sendai) and Vesicular stomatitis (Hazelhurst).

DESCRIPTION OF PREFERRED EMBODIMENTS

The most preferred compounds for purposes of the present invention are the following compounds and their hydrochloride salts:

2-camphanamine
N-methyl-2-camphanamine
N,N-dimethyl-2-camphanamine
N-ethyl camphanamine
N-ethyl-N-methyl-2-camphanamine
N,N-diethyl-2-camphanamine
N-propyl-2-camphanamine
N-isopropyl-2-camphanamine The compounds within the scope of the invention can be prepared by a variety of methods as will be obvious from the following.

2-camphanamine can be prepared by reduction of camphor oxime or by conversion of camphor to N-formyl-2-camphanamine via the Leuckart reaction using ammonium formate and hydrolysis of the formamide to the amine.

2-camphanamine can be alkylated by acylation followed by reduction. The primary amine can be acylated with an acid chloride, acid anhydride or ester to afford the N-acyl compound. Reduction with lithium aluminum hydride or catalytic hydrogenation gives the N-alkyl compound. For example, acylation of 2-camphanamine with acetyl chloride produces N-acetyl-2-camphanamine which upon reduction with lithium aluminum hydride yields N-ethyl-2-camphanamine.

N-alkylamines can be acylated again and reduced to afford N,N-dialkylated amines. Thus, N,N-dialkylamines having two different alkyl groups can be prepared by the use of two different acylating agents. N,N-dialkylamines having similar alkyl groups can be prepared by using the same acylating agent for the first and second acylations.

In preparing N-alkyl and N,N - dialkyl - 2 - camphanamines, it is not necessary to prepare the 2-camphanamine and then alkylate in subsequent steps. Reaction of camphor with the formic acid salt or formamido derivative of a monoalkylamine produces an N-alkyl-N-formyl-2-camphanamine (Leuckart reaction) which can be hydrolyzed to give an N-alkyl-2-camphanamine or reduced to produce an N-alkyl-N-methyl-2-camphanamine. N,N-dialkylcamphan-2-amines can also be prepared via the Leuckart reaction by allowing camphor to react with the formic acid salt of a dialkylamine.

N-Methyl-2-camphanamine, which can be prepared by acylation of 2-camphanamine with butyl formate followed by reduction of the formamide, can also be obtained by reduction of the formamide afforded by the Leuckart reaction of camphor with ammonium formate.

N,N-dimethyl-2-camphanamines may be prepared by acylation of N-methyl-2-camphanamine with butylformate followed by reduction of the formamide. An easier preparation of N-N-dimethyl-2-camphanamine is to use the Eschweiler-Clarke reaction of formic acid and formaldehyde with the primary amine. In fact, where one of the alkyl groups of an N,N-dialkylamine is methyl, it is easiest to introduce the non-methyl alkyl group by acylation and reduction and then to treat this with formic acid and formaldehyde to obtain the N-alkyl-N-methylamine.

N-alkyl groups can be introduced on the amino group by direct alkylation of 2-camphanamine, using an alkyl halide and an acid acceptor such as shown in M. J. Forster, J. Chem. Soc., 75, 934 (1899) or J. Tropjanek, J, Pospisek and Z. Cekan, Coll. Czechoslov. Chem. Communs., 26, 2602 (1961). When equimolar quantities of the primary amine and halide are used, the major product is the N-alkyl amine, but usually some of the N,N-dialkyl amine is formed as a byproduct. The two can usually be separated by distillation. The reaction of primary amines with excess halide usually leads to dialkylation. If an N,N-dialkyl (with two different alkyl groups) amine is desired, one starts with N-alkyl amine and introduces the second alkyl group by using an equimolar amount of the corresponding halide. With secondary amines the use of excess halide leads to quaternization and decreased yield of the desired product. The abovementioned references in accordance with these general procedures and considerations each show the preparation of the following compounds which fall within the scope of the invention and are illustrative thereof:

N - methyl - 2 - camphanamine hydrochloride; N,N-dimethyl - 2 - camphanamine hydrochloride; N - ethyl-2-camphanamine hydrochloride; N-propyl-2-camphanamine hydrochloride; and N - butyl - 2 - camphanamine hydrochloride. M. J. Forster, J. Chem. Soc., 75, 934 (1899) in addition shows the preparation of N-isopropyl-2-camphanamine. J. Tropjanek, J. Pospisek and Z. Cekan, Coll. Czechoslov. Chem. Communs., 26, 2602 (1961) in addition shows the preparation of N-ethyl-N-methyl-2-camphanamine hydrochloride; N,N - diethyl-2-camphanamine hydrochloride; and N-butyl-N-methyl-2-camphanamine hydrochloride.

Salts of the amines of this invention can be prepared in a number of ways. Generally, the amine is contacted with the acid in water or in an organic solvent. In some instances, the salt is insoluble, and is filtered and dried. For example, most of the hydrochlorides of the amines of this invention are insoluble in ether. Solvents such as alcohol and water, in which the amine salts are generally soluble, can be used just as well. After the amine and the acid have been combined, the solvent is removed by evaporation.

Because solubility of the salt in water depends to an extent on the acid anion, many salts are in fact insoluble in water and alcohols. Pamoates, for example, are usually quite water-insoluble and separate from aqueous mixtures almost quantitatively.

The following amines and their pharmaceutically acceptable salts are representative of the compounds of this invention.

2-camphanamine
N-methyl-2-camphanamine
N,N-dimethyl-2-camphanamine
N-ethyl-2-camphanamine
N-ethyl-N-formyl-2-camphanamine
N-ethyl-N-methyl-2-camphanamine
N-propyl-2-camphanamine
N-isopropyl-2-camphanamine
N,N-diethyl-2-camphanamine
N-isobutyl-2-camphanamine
N-butyl-2-camphanamine
N-butyl-N-methyl-2-camphanamine
N-allyl-2-camphanamine
N,N-diallyl-2-camphanamine To supplement the above discussion of the compounds of this invention and methods of their preparation, the following illustrative examples are presented to enable my invention to be more fully understood. The parts and percentages in the following examples are by weight unless otherwise indicated.

EXAMPLE 1

2-camphanamine hydrochloride

A solution of 79 parts of d-camphor in 200 parts of ethanol was treated with an aqueous solution obtained by mixing a saturated aqueous solution of 36.5 parts of hydroxylamine hydrochloride with a saturated solution of 71.5 parts of sodium acetate trihydrate. The mixture was heated on the steam bath for one hour and then stored overnight at room temperature. d-Camphor oxime was collected by filtration as colorless crystals, 44.2 parts, M.P. 118.5–120°.

A solution of 40 parts of d-camphor oxime in 100 parts ether was hydrogenated over Raney nickel at 100–150 atm. pressure at 70–90°. The nickel catalyst was removed by filtration and the ether dried over magnesium sulfate. The drying agent was separated by filtration and the filtrate was treated with gaseous hydrogen chloride to afford 2-camphanamine hydrochloride as colorless crystals. Recrystallization from isopropyl alcohol gave 10.2 parts of an analytical sample, M.P. 235° and having $[\alpha]_D^{23} = -38°$.

Analysis. — Calcd. for $C_{10}H_{19}N \cdot HCl$ (percent): C, 63.29; H, 10.09; N, 7.38. Found (percent): C, 63.44; H, 10.53; N, 7.12.

EXAMPLE 2

N-ethyl-N-formyl-2-camphanamine

N-ethyl-2-camphanamine (0.10 mole) (J. Tropjanek, J. Pospisek and Z. Cekan, Coll. Czechoslov. Chem. Communs., 26, 2602 (1961)) is refluxed for 19 hours in 50 ml. of butyl formate. The mixture is cooled, the excess butyl formate is removed under vacuum and the residue is dried to give N-ethyl-N-formyl - 2 - camphanamine.

EXAMPLE 3

N-isobutyl-2-camphanamine hydrochloride

To a solution of 0.10 mole of 2-camphanamine (Example 1) in dry pyridine 0.10 mole of isobutyryl chloride is added dropwise with stirring at such a rate that the temperature does not exceed 50° C. The mixture is refluxed for ½ hour, cooled and poured onto 500 ml. of cold water, and dried to yield N-isobutyryl-2-camphanamine.

To a stirred suspension of 0.15 mole of lithium aluminum hydride in dry ether is added dropwise a solution of 0.10 mole of N-isobutyryl - 2 - camphanamine in dry ether. The reaction mixture is refluxed with stirring overnight. After cooling, excess lithium aluminum hydride is decomposed with water. Insoluble aluminum compounds are removed by filtration and the ether filtrate is dried over anhydrous potassium carbonate. The ether is treated with dry gaseous hydrogen chloride to produce N-isobutylcamphane-2-amine hydrochloride as a colorless solid.

The compounds of Formula 1 can be administered in the antiviral treatment in accordance with the invention by any means that effects contact of the active ingredient compound with the site of influenze virus infection in the body. It will be understood that this includes the prophylactic administration as well as past-infection administration to the warm-blooded animal recipient. For example, administration can be parenteral, that is subcutaneous, intravenous, intramuscular, or intraperitoneal. Alternatively or concurrently, administration can be by the oral route.

In one embodiment of this invention the effectiveness of 1-2-bornylamine, a compound for this invention, is demonstrated when said compound is administered intraperitoneally at a dosage level of 2.7 mg./kg. of body weight to mice said mice being subsequently infected with influenza A/swine/S 15 virus with the result that the infectivity of said virus is markedly reduced.

The dosage administered will be dependent upon the influenza virus being treated, the age, health and weight of the recipient, the extent of infection, kind of concurrent treatment if any, frequency of treatment, and the nature of the effect desired. Generally, a daily dosage of active ingredient compound will be from about 1 to 50 milligrams per kilogram of body weight, although lower, such as 0.5 milligram, per kilogram or higher amounts can be used. Ordinarily, from 1 to 20 and preferably 1 to 10 milligrams per kilogram per day, in one or more applications per day is effective to obtain the desired result.

The compound of Formula 1 can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use (except intravenous). In such compositions the active compound will ordinarily always be present in an amount of at least 0.5% by weight based on the total weight of the composition and not more than 90% by weight.

Besides the active compound, the antiviral composition will contain a solid or liquid non-toxic pharmaceutical carrier.

In one embodiment of a pharmaceutical composition of this invention, the solid carrier is a capsule which can be of the ordinary gelatin type. In the capsule will be from about 30–60% by weight of a compound of Formula 1 and 70–40% of a carrier. In another embodiment the active compound is tableted with or without adjuvants. In yet another embodiment, the active compound is put into powder packets and employed. These capsules, tablets and powders will generally constitute from about 5% to about 95% and preferably from 25% to 90% by weight. These dosage forms preferably contain from about 5 to about 500 milligrams of active compound, with from about 25 to about 250 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectible solutions. Sterile injectible solutions such as saline will ordinarily contain from about 0.5% to 25%, and preferably about 1 to 10% by weight of the active compound.

As mentioned above, oral administration can be in a suitable suspension or syrup, in which the active compound ordinarily will constitute from about 0.5 to 10%, and preferably about 2 to 5%, by weight. The pharamaceutical carrier in such composition can be a water vehicle such as an aromatic water, a syrup or a pharmaceutical mucilage.

Suitable pharamaceutical carriers are described in "Remington's Practice of Pharmacy" by E. W. Martin and E. F. Cook, a well known reference text in this field.

In addition to the exemplary illustrations above, the following examples further explain the present invention:

EXAMPLE 4

A large number of unit capsules are prepared by filling standard two-piece hard gelatin capsules weighing about 50 milligrams each with 50 milligrams of powdered 2-camphanamine hydrochloride, 125 milligrams of lactose and 1 milligram of "Cab-o-sil."

EXAMPLE 5

Example 4 is repeated except that soft gelatin capsules are used and the powdered 2 - camphanamine hydrochloride is first dissolved in soybean oil.

EXAMPLE 6

Example 4 is repeated except that the dosage unit is 50 milligrams of compound, 5 milliagrams of gelatin, 1.5 milligrams of magnesium stearate and 100 milligrams of lactose, mixed and formed into a tablet by a conventional tableting machine. Slow release pills or tablets can also be used, by applying appropriate coatings. A sugar coating may be applied to increase palatability.

EXAMPLE 7

A parenteral composition suitable for administration by injection is prepared by stirring 5% by weight of the active compound of Example 4 in sterile aqueous 0.9% saline.

The above and similar examples can be carried out in accordance with the teachings of this invention, as will be readily understood by persons skilled in the art, by substitution of components and amounts in place of those specified. However, the disclosure herein should not be interpreted as a recommendation to utilize the disclosed invention in any way without full compliance with U.S. Food and Drug Laws. Thus, the foregoing detailed description has been given for clearness of understanding only and no unnecessary limitations are to be understood therefrom.

I claim:
1. The method for treating influenza virus infections in warm-blooded animals comprising administering to said infected warm-blooded animal an anti-influenza effective amount of a compound selected from the group consisting of
   (a) compounds of the formula

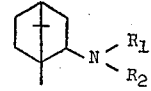

wherein
$R_1$ and $R_2$ are hydrogen or alkyl of 1 through 4 carbon atoms, and non-toxic salts thereof 2. The method of claim 1 wherein said compound is 2-camphanamine hydrochloride.
3. The method of claim 1 wherein said compound is N-methyl-2-camphanamine hydrochloride.
4. The method of claim 1 wherein said compound is N,N-dimethyl-2-camphanamine hydrochloride.
5. The method of claim 1 wherein said compound is N-ethyl camphanamine hydrochloride.
6. The method of claim 1 wherein said compound is N-ethyl-N-methyl-2-camphanamine hydrochloride.
7. The method of claim 1 wherein said compound is N,N-diethyl-2-camphanamine hydrochloride.
8. The method of claim 1 wherein said compound is N-propyl-2-camphanamine hydrochloride.
9. The method of claim 1 wherein said compound is N-isopropyl-2-camphanamine hydrochloride.
10. The method for treating influenza virus infections in an animal which comprises administering to said infected animal an anti-influenza effective amount of d-bornylamine or a non-toxic acid addition salt of d-bornylamine.
11. The method for treating influenza virus infections in an animal which comprises administering to said infected animal an anti-influenza effective amount of d-bornylamine.

References Cited

Chemical Abstracts, Sl:18302g (1957).

JEROME D. GOLDBERG, Primary Examiner